(12) United States Patent
Kelley et al.

(10) Patent No.: US 7,105,252 B2
(45) Date of Patent: Sep. 12, 2006

(54) CARBON COATED BATTERY ELECTRODES

(75) Inventors: Kurtis C. Kelley, Washington, IL (US); Steven C. Taylor, Peoria, IL (US)

(73) Assignee: Firefly Energy, Inc., Peoria, IL (US)

( * ) Notice: Subject to any disclaimer, the term of this patent is extended or adjusted under 35 U.S.C. 154(b) by 415 days.

(21) Appl. No.: 10/422,981

(22) Filed: Apr. 25, 2003

(65) Prior Publication Data

US 2003/0219653 A1   Nov. 27, 2003

Related U.S. Application Data

(60) Provisional application No. 60/382,023, filed on May 22, 2002.

(51) Int. Cl.
*H01M 4/66* (2006.01)

(52) U.S. Cl. ............ 429/245; 429/234; 429/236; 429/241; 429/228; 429/225; 429/218.1; 429/233; 427/58; 427/122

(58) Field of Classification Search ............ 429/228, 429/225, 245, 234, 236, 241, 218.1, 233; 427/58, 122
See application file for complete search history.

(56) References Cited

U.S. PATENT DOCUMENTS

| | | |
|---|---|---|
| 3,390,014 A | 6/1968 | Eisler |
| 4,485,156 A | 11/1984 | Tokunaga |
| 4,640,744 A | 2/1987 | Howe |
| 5,010,637 A | 4/1991 | Blanyer et al. |
| 5,017,446 A | 5/1991 | Reichman et al. |
| 5,106,709 A | 4/1992 | Tekkanat et al. |
| 5,223,352 A | 6/1993 | Pitts et al. |
| 5,260,855 A | 11/1993 | Kaschmitter et al. |
| 5,402,306 A | 3/1995 | Mayer et al. |
| 5,429,893 A | 7/1995 | Thomas |
| 5,512,390 A | 4/1996 | Obushenko |
| 5,677,075 A | 10/1997 | Fujita |
| 5,882,621 A | 3/1999 | Doddapaneni et al. |
| 5,952,123 A * | 9/1999 | Hatanaka et al. ......... 429/225 |

FOREIGN PATENT DOCUMENTS

| | | |
|---|---|---|
| DE | 21 35 226 A | 2/1973 |
| DE | 38 36 426 C1 | 2/1990 |
| GB | 18590 | 0/1910 |

\* cited by examiner

*Primary Examiner*—Laura Weiner
(74) *Attorney, Agent, or Firm*—Finnegan, Henderson, Farabow, Garrett & Dunner, L.L.P.

(57) ABSTRACT

A method for forming a corrosion resistant electrode for a battery includes supplying an electrode for use in the battery and exposing the electrode to an environment including vaporized carbon. At least some of the carbon from the environment may be transferred to the electrode.

17 Claims, 4 Drawing Sheets

CARBON COATED BATTERY ELECTRODES

Priority is claimed to U.S. Provisional Patent Application No. 60/382,023, filed May 22, 2002, which is fully incorporated herein by reference.

TECHNICAL FIELD

This invention relates generally to electrodes for a battery and, more particularly, to carbon coatings on electrodes for a lead acid battery.

BACKGROUND

Lead acid batteries are well known. All lead acid batteries include at least one positive electrode, at least one negative electrode, and an electrolytic solution of sulfuric acid ($H_2SO_4$) and distilled water. The actual chemical reaction, which allows the battery to store and release electrical energy, occurs in a paste that coats the electrodes. The positive and negative electrodes, once covered and/or filled with paste, are referred to as positive and negative plates, respectively. The role of the electrodes, themselves, is to transfer electric current to and from the battery terminals. Often, a primary limit to battery durability is corrosion of the electrode (e.g., current collector) of the positive plate.

Several methods have been proposed for inhibiting the corrosion process in lead acid batteries, and some of these methods have involved using carbon in various forms to slow the corrosion process. For example, Great Britain Patent No. 18,590 discloses a method designed to increase the life of a lead acid battery by protecting lead-based grids that form the positive electrodes of the battery from corrosion. This method involves treating the grids with a mixture of rubber, antimony, and graphite. The mixture is applied to the grids by either dipping the grids into the mixture or by brushing the mixture onto the grids with a brush.

As with all coating methods of this type, however, the resulting coating is relatively thick. Often, these coatings do not adhere well to the surfaces of the electrodes, and they have a tendency to fracture and flake off of the electrodes. Furthermore, additives in the coating may reduce the conductivity of the electrodes and inhibit the electron exchange processes of the lead acid battery.

SUMMARY OF THE INVENTION

One aspect of the present invention includes a method of forming a coated electrode for a battery. This method includes supplying an electrode for use in the battery and exposing the electrode to an environment including vaporized carbon. At least some carbon from the environment may be transferred to the electrode.

BRIEF DESCRIPTION OF THE DRAWINGS

The accompanying drawings, which are incorporated in and constitute a part of this specification, illustrate exemplary embodiments of the invention and, together with the written description, serve to explain the principles of the invention. In the drawings.

DETAILED DESCRIPTION

In the following description, reference is made to the accompanying drawings that form a part thereof, and in which is shown by way of illustration specific exemplary embodiments in which the invention may be practiced. These embodiments are described in sufficient detail to enable those skilled in the art to practice the invention, and it is to be understood that other embodiments may be utilized and that changes may be made without departing from the scope of the present invention. The following description is, therefore, not to be taken in a limited sense. Wherever possible, the same reference numbers are used throughout the drawings to refer to the same or like parts.

Figure 1:
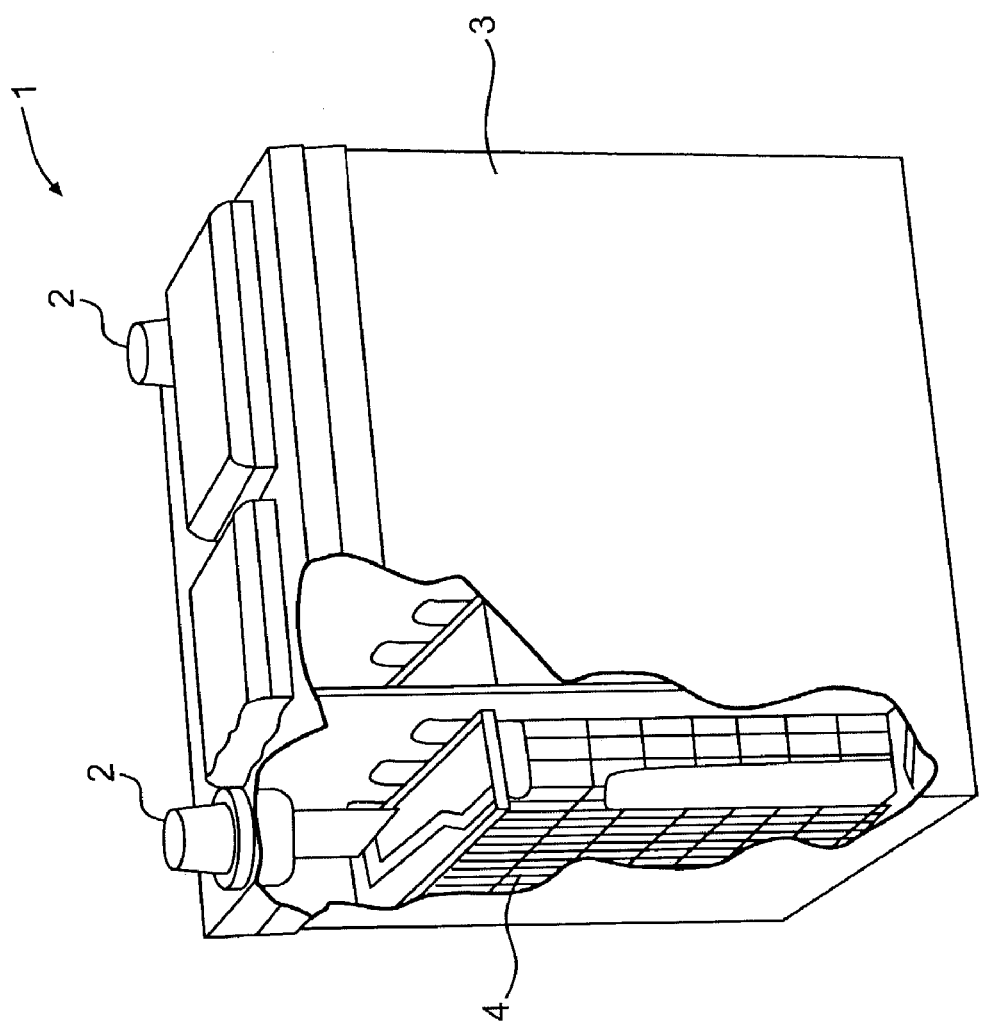
FIG. 1 is a diagrammatic cut-away representation of a battery in accordance with an exemplary embodiment of the present invention.

FIG. 1 illustrates a battery 1 in accordance with an exemplary embodiment of the present invention. Battery 1 includes a housing 3 and terminals 2. At least one cell 4 is disposed within housing 3. While battery 1 may include only one cell, several cells may be connected in series or in parallel to provide a total desired capacity of battery 1. Cell 4 may be composed of alternating positive and negative plates immersed in an electrolytic solution including, for example, sulfuric acid.

Figure 2:
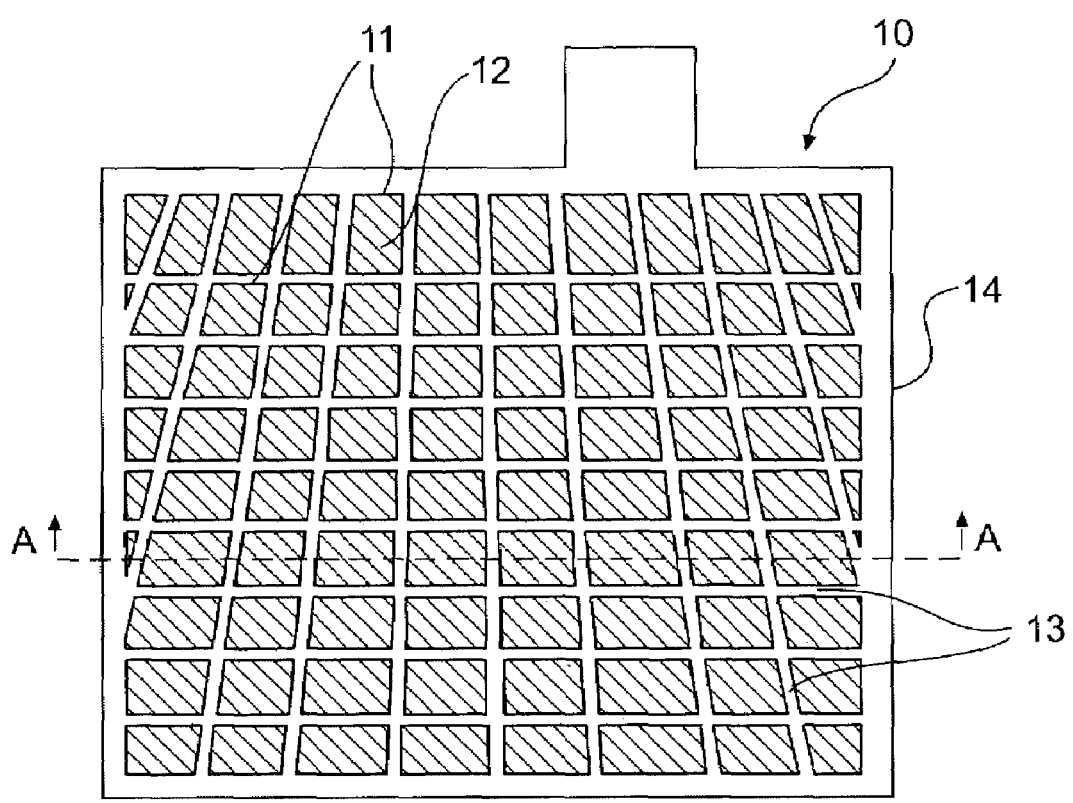
FIG. 2 is a diagrammatic representation of an electrode plate in accordance with an exemplary embodiment of the present invention.

FIG. 2 illustrates a positive plate 10 according to an exemplary embodiment of the present invention. One element of positive plate 10 is a conductive electrode 14 that may serve as the positive current collector of positive plate 10. Electrode 14 may be formed from, for example, a metal or any other suitable conductive material. While electrode 14 may include various different configurations, in one exemplary embodiment, electrode 14 may be arranged in a grid pattern including an array of crossing members 13. The array of crossing members 13 may define a plurality of interstices 11 that can be filled with a chemically active paste, such as, for example, lead dioxide ($PbO_2$) paste 12. The chemically active paste may serve as an active material of positive plate 10. The electrode 14 may be composed of lead or a lead-based alloy including elements such as, for example, antimony, cadmium, tin, or any other suitable elements. Structurally, the negative current collectors of the negative plates of each cell 4 may be similar to the current collectors of positive plates 10 of cell 4 (e.g., the negative plates may be arranged in a grid-like pattern including crossing members and interstices). The negative plates, however, may or may not include lead dioxide paste as an active material. The negative current collectors may include sponge lead or another suitable material that can serve as the active material for the negative plates.

One characteristic of a lead acid battery is the potential difference that exists between the active material (e.g., $PbO_2$) of the positive plate 10 and the active material (e.g., sponge lead) of the negative plate when immersed in an electrolytic solution, such as sulfuric acid. This potential difference can cause electrons to flow from the negative plate to the positive plate during the discharge process. This discharge process reduces the $PbO_2$ at the positive plate to form lead sulfate ($PbSO_4$). Additionally, at the negative plate, sponge lead is oxidized to form lead sulfate. The discharge process is reversible in the respect that the battery can be re-charged. In a charging process, a counter-voltage may be applied to the battery terminals to force a current through the cells in a direction opposite to that in which the cell discharges. As a result, the cell reactions of the discharge process may be reversed. Specifically, the lead sulfate at the positive plate may be converted to lead oxide, and the lead sulfate at the negative plate may be converted to sponge lead.

One process in the lead acid battery that is not reversible, however, and one that may reduce the service life of a lead acid battery, is corrosion. Once the sulfuric acid electrolyte is added to the battery 1 and the battery is charged, the electrode 14 of each positive plate 10 may be continually subject to corrosion due to its exposure to sulfuric acid and to the anodic potentials of the positive plate 10. As the electrode 14 of the positive plate 10 corrodes, lead (Pb) from the electrode 14 reacts with the sulfuric acid to form lead dioxide ($PbO_2$).

Because the lifetime of a lead-acid battery may depend on the structural integrity of the lead metal in the battery's positive plate electrode 14, the rate of corrosion ultimately may determine the life of battery 1. The corrosion rate can depend on such factors as temperature, plate potential, acid concentration, and the level of corrosion resistance offered by electrode 14. The corrosion attack may occur over a large area of each electrode 14, or it may occur at localized areas such as, for example, grain boundaries of the electrode material.

One damaging effect of the corrosion of the positive plate electrode 14 is volume expansion. Particularly, a given quantity of lead dioxide corrosion product requires more volume than the lead source material. For example, as a result of corrosion, a given sample of lead source material having a first volume A could be fully converted into a quantity of lead dioxide corrosion product having a second volume B. Volume B will be greater than volume A, and in fact, volume B of the lead dioxide corrosion product may be as much as 37% greater than volume A of the lead source material. Therefore, as electrode 14 corrodes, the ensuing volume expansion induces mechanical stresses on the electrode 14 that deform and stretch the grid. At a volume expansion of approximately 4% to 7%, the electrode 14 may fracture. As a result, battery capacity drops, and eventually, the battery may reach the end of its service life. Further, at advanced stages of corrosion, internal shorting within the electrode grid and rupture of the cell case may occur.

One method of potentially extending the service life of a lead-acid battery may is to increase the corrosion resistance of the electrode 14. In an exemplary embodiment of the present invention, a thin film of carbon may be vapor-deposited on the surfaces of electrode 14. The carbon thin film may reduce the corrosion rate of electrode 14 by limiting the contact between the electrolytic solution and the metal of electrode 14. The electrical conductivity of carbon allows electron exchange during the battery discharge and charging processes to proceed.

Figure 3A:
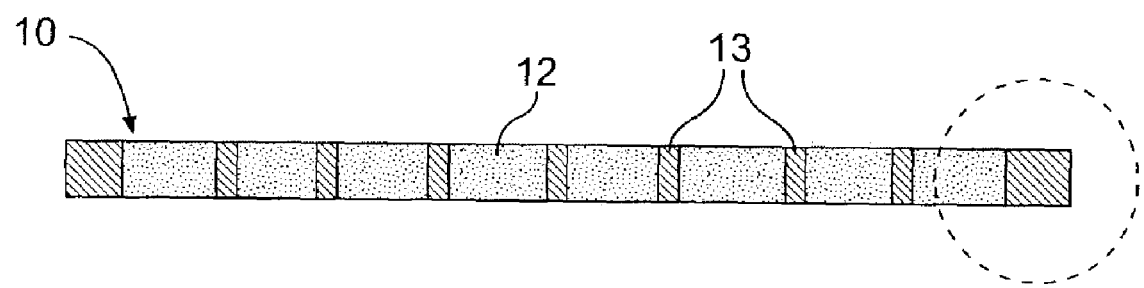
FIGS. 3A is a diagrammatic, cross-sectional representation of the electrode plate of FIG. 2 taken along the line A—A.
Figure 3B:
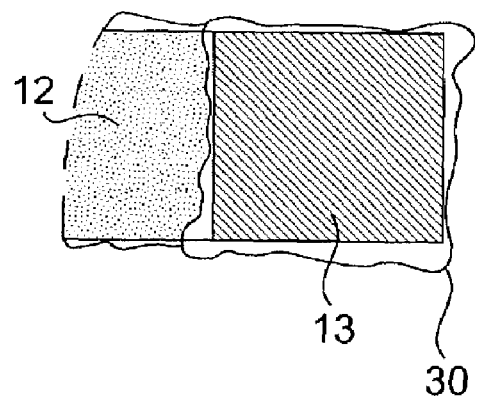
FIG. 3B is an enlarged view of a portion of the cross-sectional representation of FIG. 3A.

FIG. 3A illustrates a cross-sectional view of positive plate 10 taken along the line A—A, as shown in FIG. 2. A vapor-deposited carbon thin film is present on electrode 14, including cross members 13. FIG. 3B provides an enlarged view of the area of the positive plate 10 surrounded by the dashed circle, as shown in FIG. 3A. While not to scale, FIG. 3B illustrates vapor-deposited carbon film 30 on a cross member 13 of the electrode 14. According to an exemplary embodiment of the present invention, carbon film 30 may cover substantially all surfaces of electrode 14. In yet another exemplary embodiment, however, carbon film 30 may cover only a portion of the electrode surface area. It is contemplated that the vapor-deposited carbon films will inhibit corrosion on the electrode even with less than 100% coverage of the surface area of the electrodes. Once electrode 14 has been coated with carbon film 30, the electrode may be packed with paste 12 to form, for example, positive plate 10.

Vapor-deposited carbon thin film 30, may have a thickness that is uniform or non-uniform over the surface of electrode 14. In certain embodiments, carbon film 30 may include a surface texture that mimics the surface texture of the underlying electrode 14. Carbon film 30 may include thickness gradients. For example, near edge features of electrode 14, carbon film 30 may grow to a greater thickness than in flatter regions of electrode 14. While carbon film 30 may be formed with various average thickness values, in one exemplary embodiment of the invention, vapor-deposited carbon thin film 30 may have an average thickness of, for example, less than about 1 µm. In other embodiments, however, carbon film 30 may have an average thickness of less than about 100 nm. Furthermore, the structure of carbon film 30 may be varied. On a local level, there may exist some regions in the carbon films that include diamond-like or graphitic structures. In other regions, however, carbon film 30 may exhibit an amorphous structure.

Figure 4:
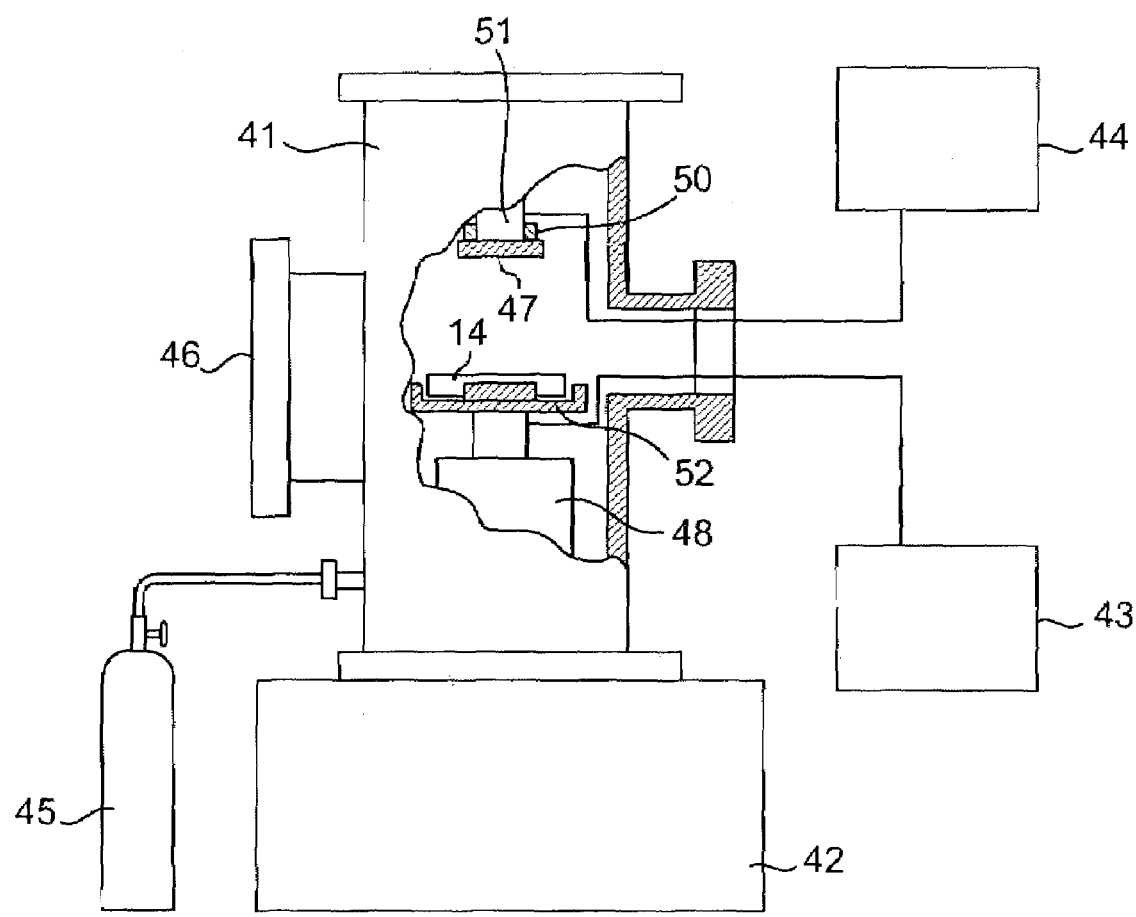
FIG. 4 is a partially cut-away, diagrammatic representation of a deposition apparatus in accordance with an exemplary embodiment of the present invention.

FIG. 4 depicts a deposition apparatus, in accordance with an exemplary embodiment of the present invention, that may be used for depositing carbon onto electrode 14. Other apparatus and techniques known to those skilled in the art could also be used. As an example of the method used to deposit carbon onto the electrode 14, the electrode 14 may be placed into a processing chamber 41, for example, a vacuum chamber, through an entry port 46. Within chamber 41, any of a variety of deposition techniques, including, for example, chemical vapor deposition, plasma assisted deposition, sputtering, arc deposition, evaporation, ion bean deposition, laser ablation, and any other suitable technique, may be used to form a carbon film on electrode 14.

In these processes, for example, a source of carbon may be used to generate vaporized carbon within an environment. The vaporized carbon may include substantially free carbon atoms, clusters of carbon atoms, or carbon particles that can be dispersed within a gaseous or vacuum environment and deposited onto a substrate, such as electrode 14. Several methods may be used for generating the vaporized carbon. For example, hydrocarbon gases may be dissociated to form vaporized carbon during, for example, chemical vapor deposition and certain plasma deposition processes. Vaporized carbon may also be formed by ablating or bombarding a carbon-containing target using lasers, ions, energetic particles, plasma, or some other suitable means to liberate carbon atoms or carbon particles from the carbon-containing source. To form a carbon film on electrode 14, at least some of the vaporized carbon may be deposited onto at least a portion of electrode 14. Any deposition of vaporized carbon onto a substrate, such as electrode 14, for example, may constitute vapor deposition consistent with the invention.

In one exemplary deposition process for forming carbon film 30, electrode grid 14 may be attached to an electrode grid support 48, which may include a series of magnets 52. A carbon target 47 may be placed in the chamber 41 and attached to a target support 51, which may include magnets 50. The carbon target 47, for example, may be a form of high purity graphite formed into a plate or pellet configuration.

Chamber 41 may be evacuated using a vacuum pump 42. In one exemplary embodiment, vacuum pump 42 may include a single vacuum pump. In other embodiments, however, the vacuum pump 42 may include a series of similar or different types of vacuum pumps (e.g. turbomolecular pumps, ion pumps, diffusion pumps, or cryogenic pumps), which cooperate to achieve a desired pressure in chamber 41. For example, the pressure in the chamber 41 may be reduced to a pressure of less than about $1\times10^{-6}$ Torr. Chamber 41 may then be backfilled with inert argon gas, from, for example, source 45, to a pressure of at least about $1\times10^{-3}$ Torr. In an exemplary embodiment of the present invention, the argon pressure may be maintained between about $1\times10^{-3}$ Torr and $1\times10^{-2}$ Torr.

Source 45 may also be configured to supply additional gases to chamber 41. For example, source 45 may include a hydrocarbon gas that can be supplied to chamber 41 to act as a source of carbon for depositing carbon film 30.

Using a voltage source 44, the carbon target may be placed at a potential of approximately –500 V, and the electrode 14 may remain at ground potential during the deposition process. As an alternative, however, the electrode 14 may optionally be placed at a potential of, for example, –80 V using voltage source 43. The negative potential at the carbon target 47 accelerates argon ions toward the surface of the target. Two processes can occur when the argon ions collide with the surface of the carbon target 47. First, carbon atoms may be liberated from the target surface by the argon ions. Some of these liberated carbon atoms can impinge upon the electrode 14 and form carbon coating 30. Second, the collision of the argon ions with the surface of the carbon target 47 can release electrons. These electrons may be held in a magnetic trap formed by magnets 50 and 52. The energy of these electrons can create additional argon ions, which, together with the electrons, may form a plasma. The additional argon ions can be accelerated toward the carbon target, and the cycle of releasing carbon atoms and electrons may be continuously maintained.

The liberated carbon atoms that impinge upon the surfaces of the electrode 14 can have velocities that encourage adhesion of the carbon atoms to the surfaces of electrode 14. As a result, the deposited carbon films of the present invention may adhere tightly to the surfaces of the electrode 14. Deposition of carbon thin film 30 may continue for a period of time sufficient to create a film of a desired thickness. As discussed previously, carbon film 30 may have a thickness of less than about 1 μm, or more particularly, less than about 100 nm.

It should be understood that while FIG. 4 depicts an apparatus for plasma-assisted magnetron sputtering, the invention may also be practiced with other forms of vapor deposition that may or may not be plasma-assisted.

INDUSTRIAL APPLICABILITY

The carbon coated electrode grid of the present invention may be useful, for example, in forming the positive plate of a lead acid battery. The vapor-deposited, carbon films of the present invention can adhere tightly to the surfaces of the electrode grids on which they are deposited. Therefore, these films may be less prone to fracture or flaking off of the electrode grids. In at least one vibration test performed on batteries including vapor deposited carbon coated electrode grids consistent with the invention, the carbon coatings significantly outperformed conventional carbon coatings in their ability to adhere to the electrode grid material and resist flaking and fracture.

The vapor deposited carbon films of the present invention may also reduce or eliminate chemical paths between the sulfuric acid electrolyte and the underlying lead electrode grids in lead acid batteries. Therefore, the vapor deposited carbon films may serve to inhibit corrosion of the positive plate electrode grid. As a result, these films may prolong the service life of lead acid batteries. It is contemplated that the vapor-deposited, carbon films of the present invention may increase the service life of some lead acid batteries by a factor of two or more. Furthermore, because carbon is conductive, the vapor-deposited carbon films do not significantly impair the electron exchange processes of the lead acid battery.

As a further benefit of the vapor-deposited carbon films of the present invention, current battery manufacturing techniques would be minimally affected. Specifically, with the exception of the added steps necessary to complete the deposition of the carbon films onto the electrode grids, all other lead acid battery fabrication steps would remain largely unchanged. Thus, the disclosed process may be incorporated into existing manufacturing processes with little or no loss of efficiency.

It will be apparent to those skilled in the art that various modifications and variations can be made in the described battery, battery grid, and method of carbon coating a battery electrode grid without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. An electrode plate for a battery, comprising:
   a current collector including lead;
   a carbon film having a thickness of less than about 1 μm coating at least a portion of the current collector to form a substrate surface including an outer surface of the carbon film and any exposed surfaces of the current collector; and
   a chemically active paste disposed on at least a portion of the substrate surface.

2. The electrode plate of claim 1, wherein the current collector is configured to include a grid pattern having an array of crossing members that define a plurality of interstices.

3. The electrode plate of claim 1, wherein the carbon film has a thickness of less than about 100 nm.

4. The electrode plate of claim 1, wherein the carbon film covers substantially all surfaces of the current collector.

5. The electrode plate of claim 1, wherein the carbon film includes vapor-deposited carbon.

6. The electrode plate of claim 1, wherein the chemically active paste includes an oxide of lead.

7. The electrode plate of claim 1, wherein the battery is a lead acid battery.

8. The electrode plate of claim 1, wherein the carbon film includes at least some region having a graphitic structure.

9. The electrode plate of claim 1, wherein the carbon film includes at least some region having an amorphous structure.

10. A battery comprising:
a housing;
a positive terminal and a negative terminal;
at least one cell disposed within the housing and including at least one positive plate and at least one negative plate immersed in an electrolytic solution;
wherein the at least one positive plate further includes
  a lead-based current collector;
  a carbon film having a thickness of less than about 1 μm coating at least a portion of the current collector to form a substrate surface including an outer surface of the carbon film and any exposed surfaces of the current collector; and
  a chemically active paste disposed on at least a portion of the substrate surface.

11. The battery of claim 10, wherein the current collector is configured to include a grid having an array of crossing members that define a plurality of interstices.

12. The battery of claim 10, wherein the carbon film has an average thickness of less than about 100 nm.

13. The battery of claim 10, wherein the chemically active paste includes an oxide of lead.

14. The battery of claim 10, wherein the carbon film includes vapor-deposited carbon.

15. The battery of claim 10, wherein the carbon film covers substantially all surfaces of the lead-based current collector.

16. The battery of claim 10, wherein the carbon film includes at least some region having a graphitic structure.

17. The battery of claim 10, wherein the carbon film includes at least some region having an amorphous structure.

* * * * *